United States Patent
Ram (10) Patent No.: US 12,436,933 B2
(45) Date of Patent: Oct. 7, 2025

(54) SYSTEM AND METHODS FOR GENERATING DYNAMIC NON-FUNGIBLE TOKENS AND FOR USING THE SAME

(71) Applicant: Phea Ram, Powhatan, VA (US)

(72) Inventor: Phea Ram, Powhatan, VA (US)

(*) Notice: Subject to any disclaimer, the term of this patent is extended or adjusted under 35 U.S.C. 154(b) by 7 days.

(21) Appl. No.: 18/389,632

(22) Filed: Dec. 19, 2023

(65) Prior Publication Data

US 2024/0202180 A1  Jun. 20, 2024

Related U.S. Application Data

(60) Provisional application No. 63/433,716, filed on Dec. 19, 2022.

(51) Int. Cl.
  G06F 16/22 (2019.01)
  A63F 13/79 (2014.01)

(52) U.S. Cl.
  CPC .......... *G06F 16/2255* (2019.01); *A63F 13/79* (2014.09)

(58) Field of Classification Search
  CPC ............................ A63F 13/79; G06F 16/2255
  USPC .......................................................... 707/793
  See application file for complete search history.

(56) References Cited

U.S. PATENT DOCUMENTS

| | | | | |
|---|---|---|---|---|
| 12,175,454 | B1* | 12/2024 | Kurani | G06Q 20/3827 |
| 12,256,029 | B2* | 3/2025 | Osborn | H04L 9/3247 |
| 2021/0133713 | A1* | 5/2021 | Wang | G06Q 20/389 |
| 2022/0343768 | A1* | 10/2022 | Di Cosola | G06Q 20/0655 |
| 2022/0366762 | A1* | 11/2022 | Nelson | G07F 17/3244 |
| 2023/0102606 | A1* | 3/2023 | Advani | H04L 63/00 726/4 |
| 2023/0177492 | A1* | 6/2023 | Vaish | G06Q 30/06 |
| 2023/0281705 | A1* | 9/2023 | Aviv | G06Q 30/0601 705/26.3 |
| 2023/0356091 | A1* | 11/2023 | Eisenberg | A63F 13/79 |
| 2023/0379178 | A1* | 11/2023 | Mamadapur | G06F 18/214 |
| 2024/0005309 | A1* | 1/2024 | Osborn | G06Q 20/065 |
| 2024/0007284 | A1* | 1/2024 | Osborn | G06F 16/164 |
| 2024/0022409 | A1* | 1/2024 | Roper | H04L 9/50 |
| 2024/0039722 | A1* | 2/2024 | DeLuca | H04L 9/50 |
| 2024/0095700 | A1* | 3/2024 | McDonnell | G06Q 30/0224 |
| 2024/0104642 | A1* | 3/2024 | Kang | H04L 9/50 |

* cited by examiner

*Primary Examiner* — Hanh B Thai
(74) *Attorney, Agent, or Firm* — Daignault Iyer LLP (57) ABSTRACT

Systems and method are provided for generating and using dynamic non-fungible tokens ("dNFTs" and/or "sdNFTs"). The disclosed systems and methods provide the ability to merge multiple dNFTs/sdNFTs into in a single dNFTs/sdNFTs that incorporates selected features of the previous multiple tokens, and the use of such tokens across multiple various blockchain based platforms. Aspects of the disclosure provide a user interface through which a wallet owner may customize the features of their resulting merged dNFTs/sdNFTs. The dNFTs/sdNFTs may also include metadata indicating various usage statistics associated with the dNFT/sdNFT. The dNFTs/sdNFTs may include and represent various properties, characteristics, and features applicable to a character in a blockchain-based video game.

20 Claims, 6 Drawing Sheets

SYSTEM AND METHODS FOR GENERATING DYNAMIC NON-FUNGIBLE TOKENS AND FOR USING THE SAME

CROSS-REFERENCE TO RELATED APPLICATIONS

This application claims the priority benefit of U.S. Provisional Patent Application No. 63/433,716 filed on Dec. 19, 2022, which is incorporated herein by reference in its entirety.

FIELD OF THE INVENTION

The present invention relates to the generation, modification, operation, tracking, and use of digital assets. Methods of and systems for such creation, modification, operation, tracking, and uses are described herein.

BACKGROUND OF THE INVENTION

Non-fungible tokens (NFTs) are unique identifiers stored on a blockchain that either represent, or are otherwise associated with, digital assets. The types of NFTs available on the current NFT market have limited functionality because they are static. A conventional (i.e. "static") NFT is an NFT that cannot be changed after the minting is complete.

The limitations of conventional NFTs are particularly apparent in the computer game industry. For example, in current blockchain game projects that use NFTs, the NFTs are static, which limits what can be done after the minting of the NFT. During the minting process, which is typically randomized, a user might possibly receive a rare NFT that includes a higher number of unique, special, and/or distinguishing features. However, the chances of that are low due to the randomized nature of the distribution and the limited availability of the rare tokens. A user will most likely receive a common NFT, which cannot be changed after the token is generated ("minted") due to its static functionality. Conventionally, a user would then only be able to obtain a rare NFT by purchasing it on the open market.

Another limitation with NFTs currently used in computer games is that the NFT is only usable for one project/game. Players of video games often desire to upgrade their NFT, maintain their play history and related statistics on the NFT, or temporarily loan or rent their particular NFT. But current NFTs do not permit such functionality.

In view of the disadvantages inherent in the known types of static NFTs and digital assets, the present invention provides new and improved systems and methods for generating, modifying, and using dynamic digital assets.

In a first aspect of the present invention, there is provided a method of generating, using, and modifying a dynamic non-fungible token (dNFT). In a second aspect of the present invention, there is provided a method of generating, using, and modifying a synergistic dynamic non-fungible token (sdNFT). For example, both dNFTs and sdNFTs may be modified to add or remove unique properties or characteristics to or from the token.

In the context of a computer video game using NFTs, the dynamic functionality of the dNFTs of the instant invention allows a player or owner to earn or upgrade their dNFT to a higher tier with greater functionality through gameplay, purchase, merging, and promotional offerings.

In the scope of the present invention, sdNFTs are also portable to other computer video games that use NFTs on the same platform or a different platform within the same ecosystem. As one example, a sdNFT obtained in the context of a particular game on a particular platform could be used in another game on the same platform. As such, the data, functionality, and features of that sdNFT can be used in a different game, thereby increasing the functionality, utility, and significance of a particular sdNFT.

SUMMARY OF THE INVENTION

The current disclosure provides for systems and methods relating to generating and using dynamic non-fungible tokens.

In accordance with aspects of the disclosure, systems and methods are provided for receiving a user selection of a first dynamic non-fungible token, the first dynamic non-fungible token including first metadata representing a first set of properties, features, and statistics, and a first identifier indicating an owner of the first dynamic non-fungible token; receiving a user selection of a second dynamic non-fungible token, the second dynamic non-fungible token including second metadata representing a second set of properties, features, and statistics, and a second identifier indicating an owner of the second dynamic non-fungible token; receiving a user selection of preferred properties and features to be included in a third dynamic non-fungible token that includes third metadata representing a third set of properties, features, and statistics; extracting the first metadata from the first dynamic non-fungible token; extracting the second metadata from the second dynamic non-fungible token; integrating a subset of the first metadata, a subset of the second metadata, and user selection of preferred properties and features into the third metadata representing the third set of properties and statistics; generating the third dynamic non-fungible token that includes the third metadata and a third identifier indicating the owner of the third dynamic non-fungible token; recording the third dynamic non-fungible token on a blockchain.

In other aspects of the disclosure, the first identifier, second identifier, and third identifier are the same.

In yet other aspects of the disclosure, the second identifier is different from the first identifier and the third identifier.

In yet other aspects of the disclosure, the system and method is configured to destroy the first dynamic non-fungible token and the second dynamic non-fungible token after generating the third dynamic non-fungible token.

In yet other aspects of the disclosure, the user selection of the first dynamic non-fungible token, the user selection of the second dynamic non-fungible token, and the user selection of preferred properties and features to be included in the third dynamic non-fungible token is performed through a user interface accessible via a user device, and the second identifier is different from the first identifier and the third identifier.

In yet other aspects of the disclosure, the third dynamic non-fungible token is generated by a permanent merge process.

In yet other aspects of the disclosure, the third dynamic non-fungible token is generated by a temporary merge process.

In yet other aspects of the disclosure, a draft of the third dynamic non-fungible token is generated and saved prior to the generation of the third dynamic non-fungible token.

DETAILED DESCRIPTION

One embodiment of the present invention is a dynamic non-fungible token (dNFT). A dNFT is not static. dNFTs may also be displayed on a gaming platform for research, indexing, status, incentivize friendly competition, and inspire creativity.

One embodiment of the present invention is a synergistic dynamic non-fungible token (sdNFT). Like a dNFT, a sdNFT is not static. sdNFTs may also be displayed on a gaming platform for research, indexing, status, incentivize friendly competition, and inspire creativity. sdNFTs also have the added functionality of being portable across multiple platforms, blockchains, and ecosystems (e.g., web, App, decentralized application (DAPP), or Desktop). sdNFT have a unique application in that all properties and statistics associated with that token are not dedicated only to one particular environment, game, or ecosystem. The sdNFTs may be portable to a different blockchain using cross-chain (e.g. an "atomic swap").

In one embodiment of the present invention, a base token (i.e. dNFT or sdNFT) resides on the blockchain, while the wearable and statistical metadata resides "off chain" on a compatible database that is centralized or decentralized (e.g. Amazon (AWS) S3, MongoDB, or IPFS). All metadata is available in real-time. In one embodiment, the token (i.e. dNFT or sdNFT) connects to a game via a compatible wallet connection application/protocol (e.g. WalletConnect). Digital wallets are used in connection with blockchain platforms to manage digital assets including fungible tokens, NFTs, dNFTs, and sdNFTs. The game itself can run on the web, mobile, desktop, or through emulation on a local or remote platform centralized or decentralized. Note, availability on a particular platform is ultimately subject to the regulations and rules of the platform.

The dNFTs and sdNFTs of the present invention can be upgraded to a higher tier in multiple ways. The upgrade can be earned through game play or purchased. Upgrades can also be the result of external conditions such as air drops, community engagement and promotional events, and loyalty rewards for users that hold their tokens for particular periods of time. After users acquire certain abilities for their dNFT and/or sdNFT, the users have the option to associate with their token short audio/video animations demonstrating unique features of the token. The audio/video animations may be configured to play in the display area of the gaming platform upon some cue or initiation. For example, such an animation could demonstrate a video game characters usage of a weapon associated with the token for that character.

The dNFTs or sdNFTs of the present invention may also be merged. Merging, or merge minting, is the process of exchanging multiple lower tier tokens (dNFT or sdNFT) to receive a higher tier token. The process provides users the option to select the properties of the new dNFT or sdNFT that the user will receive in exchange for the multiple lower tier tokens. In one embodiment, a user that chose to merge their dNFTs and/or sdNFTs has a particular time period (e.g. 30 days) in which they may cancel the merge. If the user cancels the merge within the designated time period, the dNFTs or sdNFTs that had been merged will revert back to their previous status as separate, individual dNFTs or sdNFTs. If the user does not cancel the merge within designated time period, the merge will become permanent and the merged dNFTs or sdNFTs cannot be subsequently repartitioned. The lower tier dNFTs or sdNFTs will be permanently burnt from the circulating supply making the supply deflationary.

In one embodiment of the present invention, a dNFT owner may rent or loan a particular dNFT to another user for a temporary time period. During the rent or loan period, the user that rented or received the loaned token can positively impact (positively or negatively) the statistics and properties associated with that token through its usage and play history. In some embodiments of the present invention, the impact can be restricted to only a positive impact. When the dNFT is rented or loaned, the dNFT remains on the same platform, network or ecosystem. The token is not transferred to the renter's wallet. This renting or loaning capability is also a feature of sdNFTs.

In one embodiment of the present invention, there are three minted supplies of dNFTs or sdNFTs. Each supply is distributed among seven tiers: Common, Rare, Ultra Rare, Legendary, Ultra Legendary, APEX, APEX MAX. A Common tier dNFT/sdNFT has five or six unique properties. A Rare tier dNFT/sdNFT has eight unique properties. An Ultra Rare tier dNFT/sdNFT has nine unique properties. A Legendary tier dNFT/sdNFT has ten unique properties. An Ultra Legendary tier dNFT/sdNFT has twelve unique properties. An Apex tier dNFT/sdNFT has thirteen unique properties. An Apex Max tier dNFT/sdNFT has additional unique properties.

A merging exchange rate (i.e. the value of a higher tier token in terms of lower tier tokens) may be customized to each game or universal across all games on a particular platform. For example, in the present invention, a user may upgrade tokens of a lower tier by merging them together to obtain a single token of a higher tier. For example, five Common tier tokens may be merged to obtain one Rare token having two selectable options. Alternatively, a user could merge ten Common tier tokens in exchange for a single Ultra Legendary token having six selectable options. A user is not required to merge their lower tier dNFT or sdNFT into each tier in any particular sequence. Further, in one embodiment only tokens from same mint may be merged. In another embodiment, tokens from different mints may be merged through a process called a "cross species merge mint."

In one embodiment of a computer game using dNFT or sdNFT embodiments of the present invention, the properties and statistical data associated with a particular dNFT or sdNFT can be updated. Such properties include character features like strength, speed, agility, durability, intelligence, cosmic and nature abilities. Properties and statistics typically pass through a merge to the higher tier token. In one embodiment, the properties and/or statistics from each token (dNFT or sdNFT) to be merged are averaged and imported into the new higher tier token. However, it is within the scope of the present invention for the statistics and properties of the lower tier tokens to be combined, incorporated, and/or integrated into the new token in other ways. By contrast, wearables and other accessories typically do not carry through a merge. In one embodiment, properties carry through a merge, and wearables do not. In another embodiment, both properties and wearables carry through a merge. In another embodiment, wearables not restricted to a specific tier may carry through the merge (along with properties), but wearables restricted to a specific tier do not carry through the merge.

In one embodiment of the present invention, a token (dNFT or sdNFT) includes wearable items for characters in the game to use or permanently acquire. Exemplary wearable items include: leather jackets, knight suit, ninja/samurai suit, armor (various cultural heritage styles), helmets (e.g., military, samurai, other), weapons/accessories, neo summoning mask, fur, forcefield (with selectable colors), cosmic powers, nature powers, hair style (e.g., unique, mohawk), leather gloves, leather shoes, gloves metamaterials, military shoes, gameplay background. In the case of sdNFTs, those features (e.g. character power, abilities and properties) may transfer to other games in other platforms or environments.

In an exemplary embodiment, the game is a sci-fi, anime, action/shooter, space game.

The dNFTs and sdNFTs of the present invention can also be applied to other collectible items outside of the video game context. One such type of collectible is a digital sport card NFT. Applying the concepts of the invention would yield a sports card dNFT or sdNFT. A dNFT or sdNFT sports card would include both static and dynamic data. Static data would include the year or release. Dynamic data would include the name, position, and team of the athlete. Dynamic data would also include the athlete's statistics, and the image of the real or imaginary. The dynamic capabilities of the dNFT and sdNFT would permit the token metadata to be updated to reflect the athlete's current record.

Figure 4:
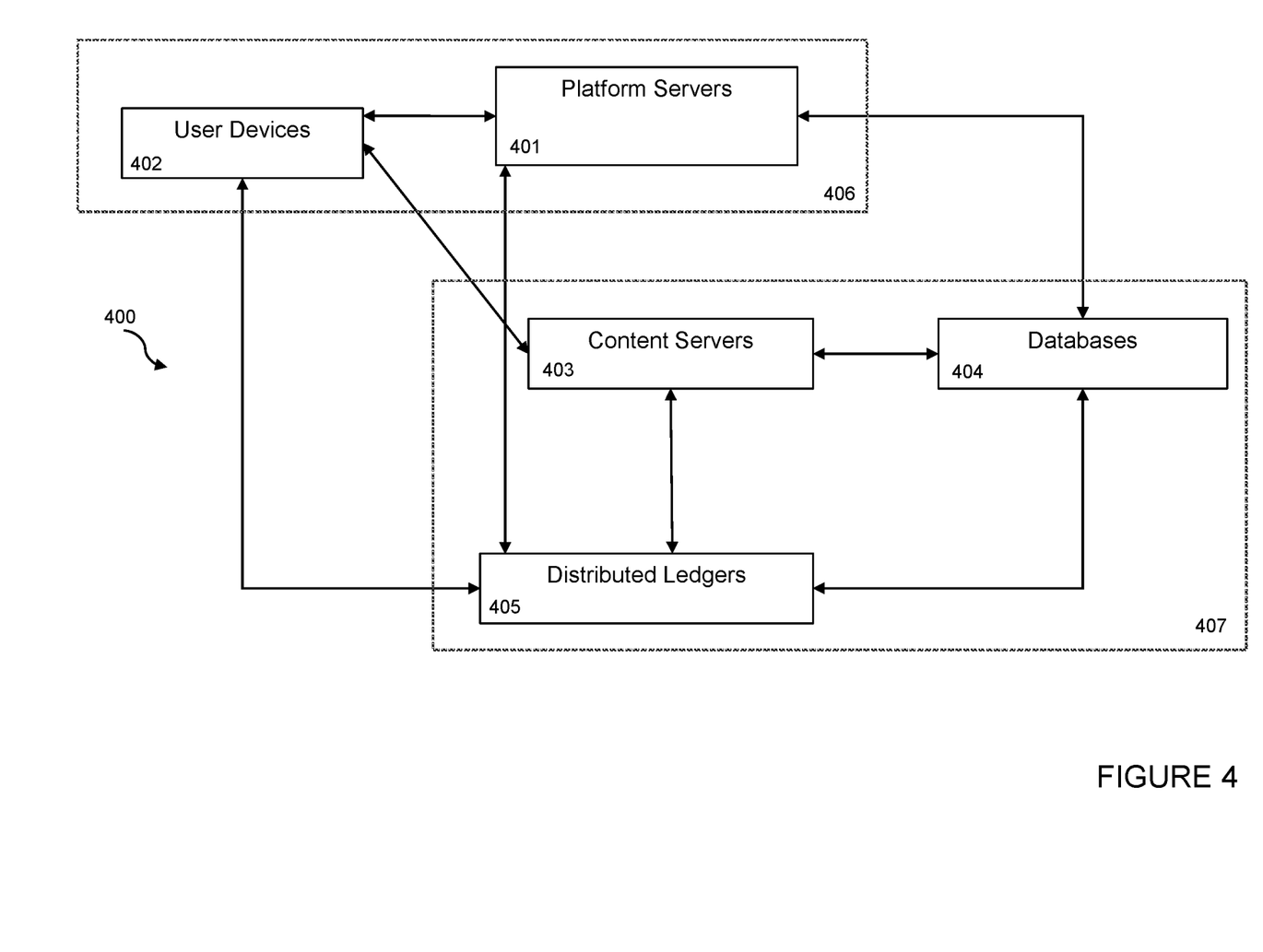
FIG. 4 is a block diagram of the network architecture associated with generating digital assets according to an aspect of the present disclosure.

FIG. 4 illustrates an exemplary system network architecture 400 associated with generating digital assets according to an aspect of the present disclosure. The system network architecture 400 includes, but is not limited to, platform servers 401, user devices 402, content servers 403, databases 404, and distributed ledgers 405. A front end 406 of the system 400 comprises at least platform servers 401. In one embodiment, the front end 406 also includes user devices 402. Backend 407 of the system 400 may include, but is not limited to, content servers 403, databases 404, and distributed ledgers 405.

Platform servers 401 are one or more server modules that host a particular platform service environment that is based on, or compatible with, one or more blockchains (e.g., distributed ledgers 405). Servers may include, but are not limited to, one or more of the following: one or more processors, one or more hardware memory components, one or more connection ports for connecting with other components in a network, and one or more peripheral interfaces. The platform hosted on platform servers 401 provides an environment in which to users may interact with other software programs hosted on the servers. For example, in one embodiment, the platform hosted on platform servers 401 permits users to interact with a video game hosted on, or compatible with, a particular platform. The users may also use, modify, and/or manage their digital asserts (e.g., dNFTs, sdNFTs) on the platform. The platform servers 401 communicate with one or more user devices 402 to send/receive data to/from the user devices, permitting a user of a user device 402 to interact with the platform and the system backend (which may include databases 404, content servers 403, and distributed ledger 405). The platform servers 401 communicate with the databases to send/receive the data regarding, e.g., the particular features and characteristics of the dNFT/sdNFT. In one embodiment, platform servers 401 interact with content servers 403 through user devices 402, databases 404, and/or distributed ledgers 405. In one embodiment, the platform servers are web servers.

User devices 402 are the devices that permit a user to interact with the platform servers 401 and the components in backend 407. User devices 402 can include mobile devices, laptops, desktops, and/or virtual desktops.

Content servers 403 host and serve content to the user device, in collaboration with the platform servers 401, databases 404, and distributed ledgers 405. Content may include, but is not limited to, media content (e.g., interactive programs, audio files, video files, document content), and media features associated with dNFTs/sdNFTs. For example, in one embodiment, the content servers work with platform servers 401, databases 404, and distributed ledgers 405 to provide a user device 402 with access to a video game based on a particular blockchain platform.

Databases 404 collaborate with the platform servers 401, content servers 403, and distributed ledgers 405 to manage and host data associated with the digital asset management system and platform service. Databases 404 exchange data with platform servers 401 and content servers 403 to provide the particular software program of interest to the user devices 402. For example, databases 404 may call the content from the content server 403, and process and send the content to the platform servers 401, which then sends the content to the user devices 402. Alternatively, content servers 403 may call data stored in databases 404 to then send to the user devices 402. Databases 404 may also communicate with the distributed ledger 405 to register and/or record information or transactions associated with the data stored in databases 404.

The distributed ledgers 405 communicates with platform servers 401, content servers 403, databases 404, and user devices 402 to track and record transactional information associated with the digital asset management system and platform service. For example, users of user devices 402 are able to interact with the distributed ledgers 405 to manage digital assets recorded on the blockchain. The distributed ledgers 405 can pass data (e.g., cryptographic hashes, and encrypted data strings) representing digital assets to the user devices 402, which can then collaborate with the platform servers 401 and content servers 403 to, e.g., use or transfer the digital asset on a particular platform. Content and information stored on content servers 403, databases 404, and platform servers 401 can also be cryptographically recorded on the distributed ledgers 405. Distributed ledgers 405 may send/receive blockchain information and formatting and validation data to some or all of the other elements illustrated in FIG. 4. User devices 402 communicate with the distributed ledgers 405 to send/receive information about the user's wallet (which resides on the user device). The distributed ledgers 405 communicate with the content servers 403 to generate/maintain the specific details of digital assets (e.g., dNFTs/sdNFTs) and/or software programs. For example, in one embodiment, the distributed ledgers 405 record and track in a blockchain format features and metadata associated with a particular dNFT/sdNFT as the content is manipulated, such as when it is used in a blockchain-based video game. Distributed ledgers 405 may also communicate with databases 404 to record and update features associated with a particular dNFT/sdNFT, such as unique features and capabilities of a video game character. Distributed ledgers may also maintain certain features of digital assets. In one embodiment, distributed ledgers maintain the smart contracts relevant to a particular dNFT/sdNFT.

Figure 1:
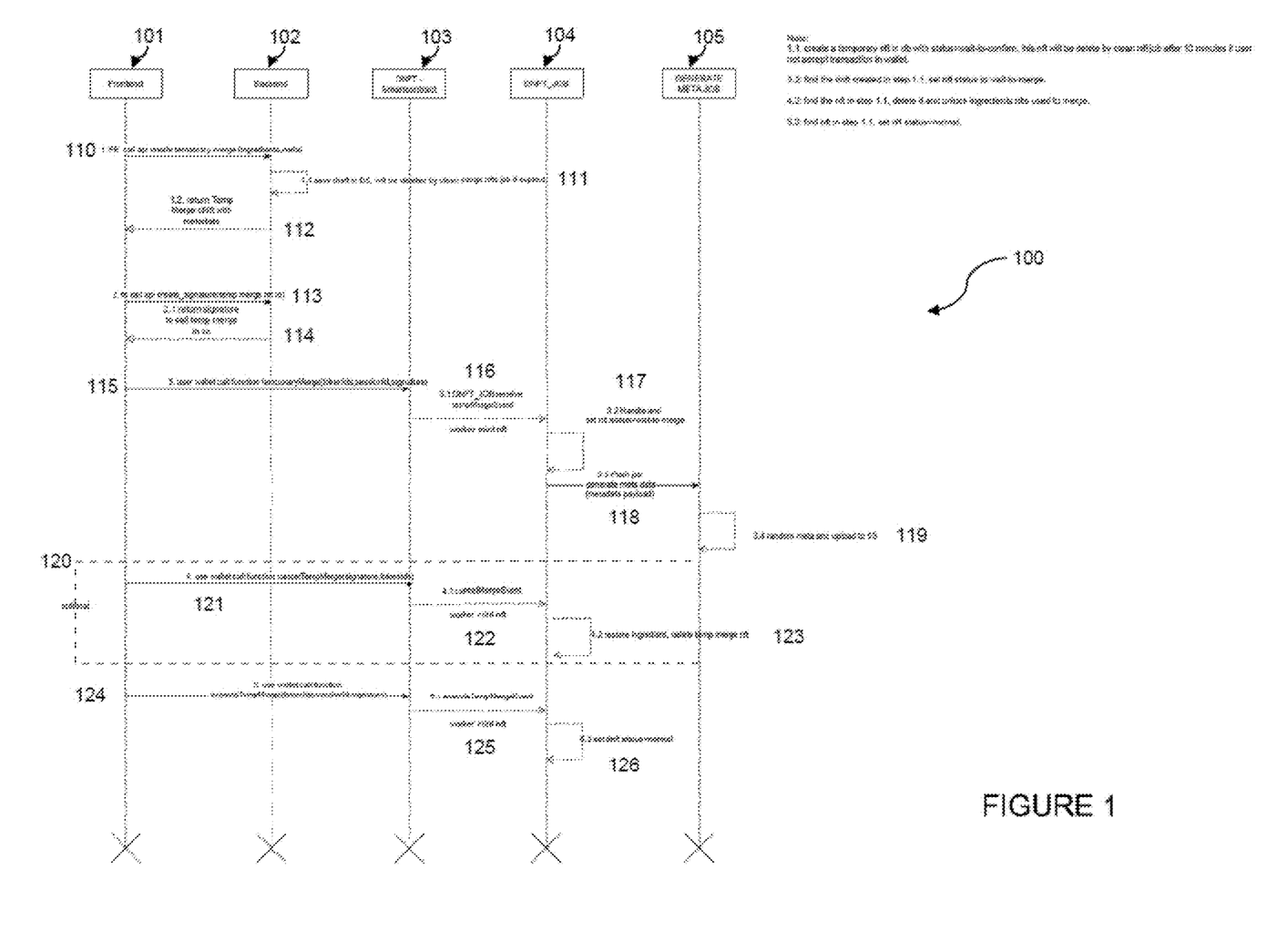
FIG. 1 is an event trace of the temporary merge process according to an aspect of the present disclosure.

FIG. 1 is an event trace for a temporary merge process 100, illustrated by various signal flows between various endpoints. Frontend 101 is the front end of the system (e.g., the system 400 shown in FIG. 4), which includes at least platform servers (as described above for FIG. 4) and may also include user devices (as described above for FIG. 4). Backend 102 is the back end of the system, which may include content servers, databases, and distributed ledgers (as described above for FIG. 4). dNFT Smartcontract 103 is the smart contract associated with a digital asset (e.g., dNFTs/sdNFTs) and which is maintained on the back end components. DNFT_JOB 104 is the step at which a particular dNFT/sdNFT may be combined or merged with another dNFT/sdNFT or particular features associated with another dNFT/sdNFT. In one embodiment, DNFT_JOB 104 occurs primarily in elements on the front end. In another embodiment, DNFT_JOB 104 occurs primarily in elements on the back end. However, DNFT_JOB 104 typically collaborates with elements on the front end and the back end when performed. GENERATE META JOB 105 is the step at which the resulting merged dNFT/sdNFT is finalized and recorded on the blockchain.

At step 110, the wallet owner initiates the temporary merge process 100 through a user device and application interface (API) that communicates with the system backend 102. The features and aspects (e.g., "ingredients, meta") to be included in the resulting merged dNFT/sdNFT are transmitted as data to backend 102 for processing.

At step 111, Backend 102 components save a draft of the resulting dNFT/sdNFT in its databases. The draft is only temporary and can be configured to expire after a set period of time (e.g., 10 minutes) if the merge process is not completed. In one embodiment, the draft serves as a placeholder for the resulting merged dNFT/sdNFT.

At step 112, the draft of the target dNFT/sdNFT with associated metadata is returned to Frontend 101. In one embodiment, the draft of the dNFT/sdNFT can also be accessed by the user device. For example, the user may be able to access the draft in a designated wallet.

At step 113, Frontend 101 components call a function (e.g., "create_signature") to create a digital signature for the draft of the target dNFT/sdNFT (e.g., represented by "temp merge nft id"). The signature is created at Backend 102 and returned (at step 114) to Frontend 101.

At step 115, Frontend 101 components call a function (e.g., "temporaryMerge") to begin the temporary merge event in collaboration with the distributed ledgers of the blockchain. In one embodiment, the function called at step 115 is called from, by, or in the designated wallet of the user. The function called at step 115 processes information associated with the temporary merging event in connection with one or more smart contracts 103 recorded on the distributed ledgers of the blockchain. In one embodiment, the information includes the signature created in step 113, an identifier for the merging session (e.g., "sessionId"), and the identifiers (e.g., "tokenIds") for both the dNFTs/sdNFTs to be merged and the draft target dNFT/sdNFT created in steps 110-112. In one embodiment, existing smart contracts associated with the dNFTs/sdNFTs identified for merging are analyzed to confirm that the proposed merge is compliant with the existing smart contracts. Further, a new smart contract may be created at 103 and associated with the draft target dNFT/sdNFT.

At steps 116-119, the temporary process 100 continues to set up all parameters necessary to eventually complete the merge. At step 116, data details associated with the merge (including relevant smart contracts) are transmitted to the DNFT_JOB 104 endpoint where (at step 117) the minting process is primed for execution using the data details received. For example, in one embodiment, at step 117 the process 100 sets a status indicator of the draft target dNFT/sdNFT created in steps 110-112 to a standby mode (e.g., "wait-to-merge"). At step 118, metadata associated with the merge process and target dNFT/sdNFT is generated and linked to the target dNFT/sdNFT. Step 119 occurs at the "GENERATE META JOB" endpoint, which is essentially a publishing step for the draft target dNFT/sdNFT. At step 119, the metadata generated in step 118 is uploaded to the backend databases. In one embodiment, the metadata is randomly generated. In another embodiment, the metadata is selectively generated. In yet another embodiment, the metadata can be both selectively and randomly generated.

In one embodiment, for steps 110-119, the focus of the temporary merge process 100 is to create a finalized draft of the target dNFT/sdNFT, ensure that sufficient resources have been allocated and/or locked/reserved/registered for the merge, and prime the temporary merge process for execution. This allows the user to preview all impacts and expected results of the merge before it occurs.

At steps 120-123, a user has the option to cancel the temporary merge before the merge occurs. To do so, Frontend 101 components call a function (e.g., "cancelTempMerge") to cancel the temporary merge event in collaboration with the distributed ledgers of the blockchain. In one embodiment, the function is called at step 121 from, by, or in the designated wallet of the user. The function called at step 121 processes information associated with the temporary merging event in connection with one or more smart contracts 103 recorded on the distributed ledgers of the blockchain. In one embodiment, the information includes signature created in step 113, and the identifiers (e.g., "tokenIds") for both the dNFTs/sdNFTs to be merged and the draft target dNFT/sdNFT created in steps 110-112. At step 122, data details associated with the merge (including relevant smart contracts) are transmitted to the DNFT_JOB 104 endpoint where (at step 123) the minting process is aborted and the draft of the target dNFT/sdNFT is deleted and the dNFTs/sdNFTs identified to be merged are restored to their original states.

If the user does not wish to cancel the temporary merge, for example after completing step 119, the process 100 continues to steps 124-126 to complete the temporary merge. At step 124, Frontend 101 components call a function (e.g., "executeTempMerge") to execute the temporary merge event in collaboration with the distributed ledgers of the blockchain. In one embodiment, the function called at step 124 is called from, by, or in the designated wallet of the user. The function called at step 124 again processes information associated with the temporary merging event in connection with one or more smart contracts 103 recorded on the distributed ledgers of the blockchain. In one embodiment, the information includes the signature created in step 113, an identifier for the merging session (e.g., "sessionId"), and the identifiers (e.g., "tokenIds") for both the dNFTs/sdNFTs to be merged and the draft target dNFT/sdNFT created in steps 110-112. In one embodiment, existing smart contracts associated with the dNFTs/sdNFTs identified for merging are analyzed to again confirm that the proposed merge is compliant with the existing smart contracts. At step 125, data details associated with the merge (including relevant smart contracts) are transmitted to the DNFT_JOB 104 endpoint where (at step 126) the minting process is execution using the data details received. For example, in one embodiment, at step 126 the process 100 sets a status indicator of the draft target dNFT/sdNFT created in steps 110-112 to a normal mode (e.g., "normal") indicating that the merge has been cleared to occur.

Figure 2:
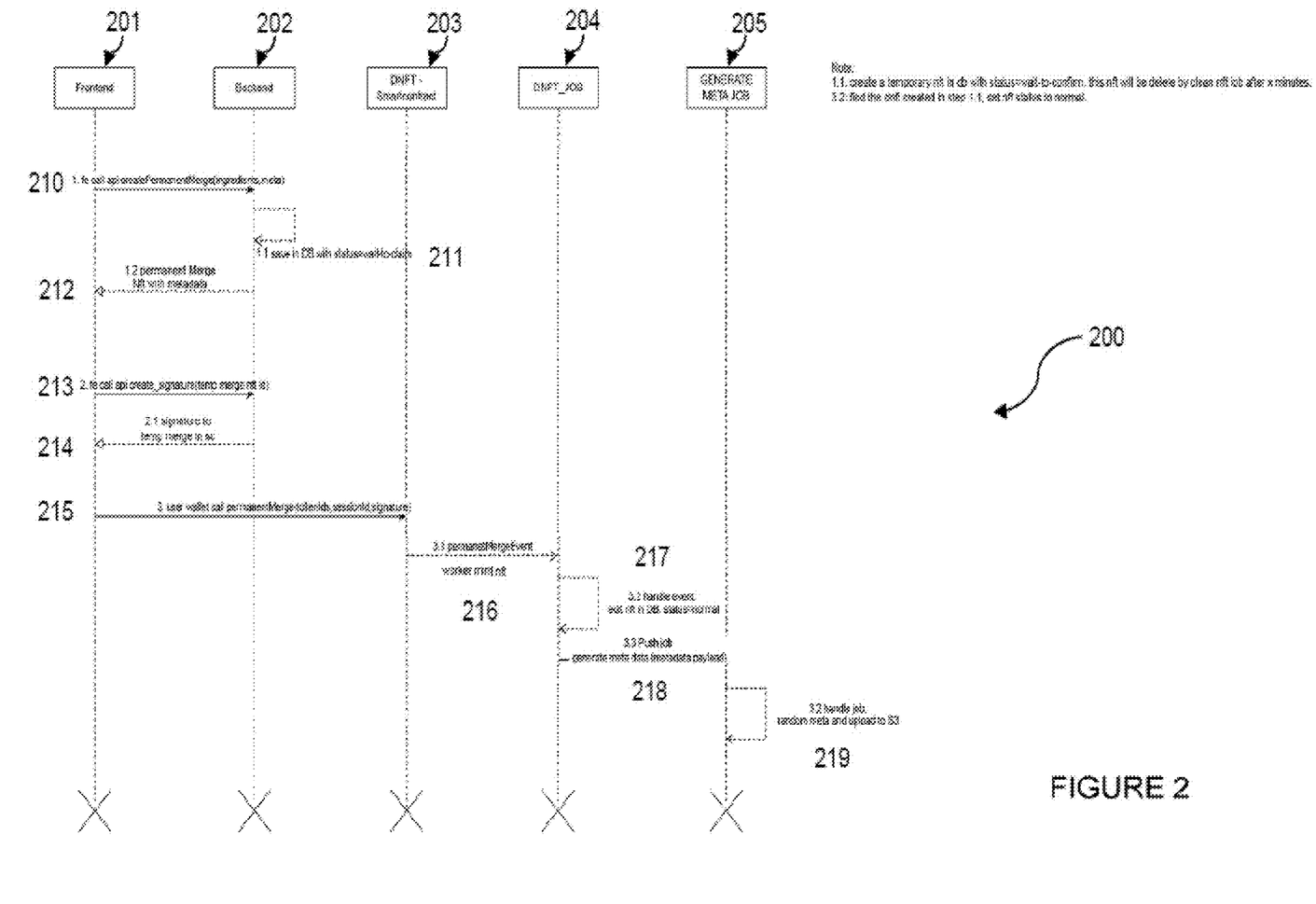
FIG. 2 is an event trace of the permanent merge process according to an aspect of the present disclosure.

FIG. 2 is an event trace of the permanent merge process 200. Endpoints 201-205 generally correspond to endpoints 101-105 as described above for FIG. 1. The permanent merge process 200 is set up and primed for execution through steps 210-219, which at a high level are similar to the steps used to set up and prime the temporary merge process for execution (steps 110-110 in FIG. 1). However, steps 210-219 include function calls specific to the permanent merge process 200 instead of the temporary merge process 100 (e.g., "createPermanentMerge," "permanentMerge"). Like in the temporary merge process 100 in FIG. 1, the user has an opportunity after step 219 to cancel or abort the permanent merge process using steps 220-223 (not pictured), which are similar to steps 120-123. If the user does not wish cancel or abort the permanent merge process, the process continues to steps 224-226 (not pictured) to execute the permanent merge. Steps 224-226 are similar to steps 124-126 of the temporary merge process 100 in FIG. 1. However, steps 224-226 include function calls specific to the permanent merge process 200 instead of the temporary merge process 100 (e.g., "executePermanentMerge").

Figure 3:
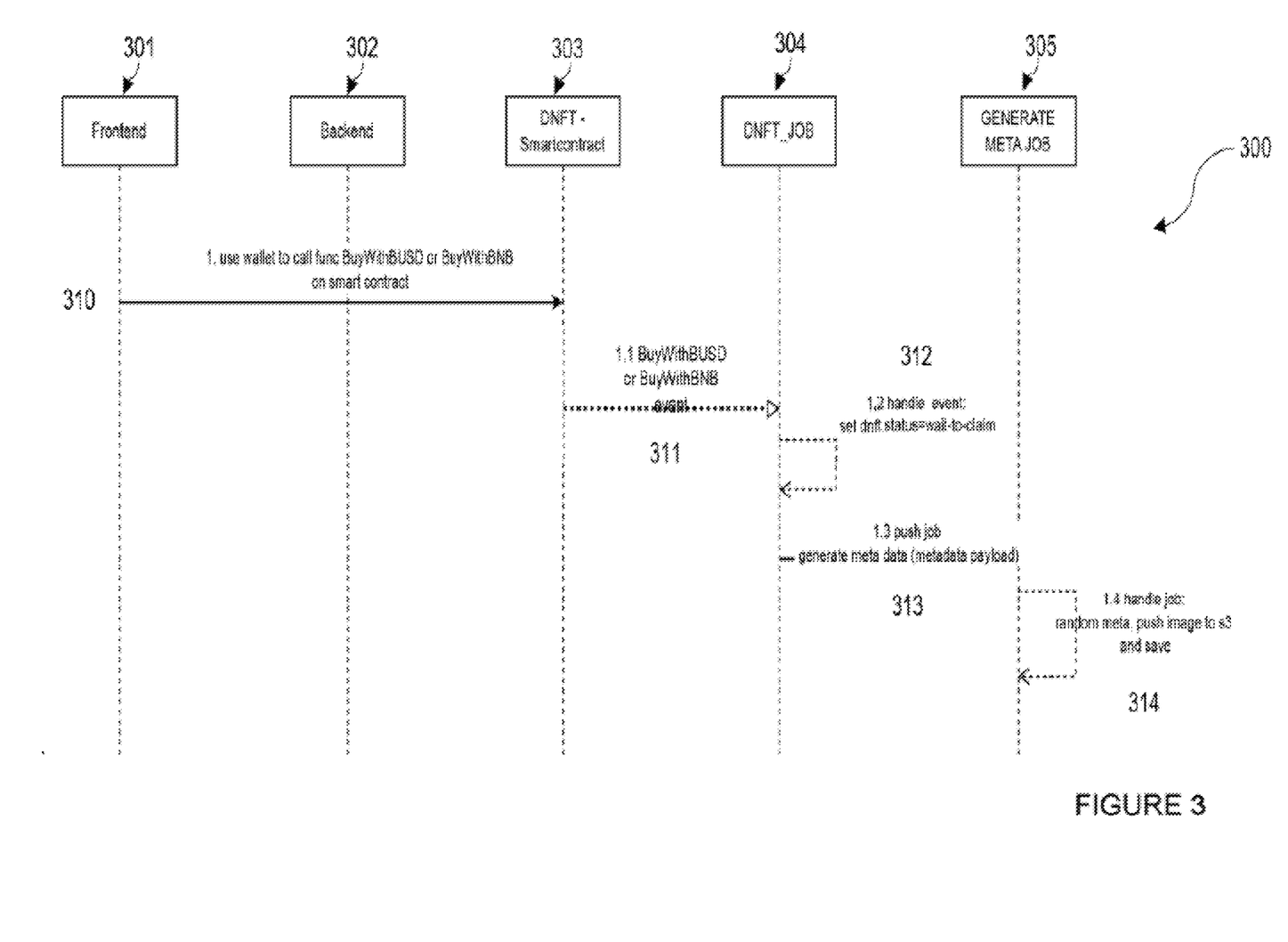
FIG. 3 is an event trace of the dNFT purchase/sale process, which is applicable to any digital currency, according to an aspect of the present disclosure.

FIG. 3 is an event trace of the dNFT purchase/sale process 300, which is applicable to any digital currency. Endpoints 301-305 generally correspond to endpoints 101-105 as described above for FIG. 1. Fees are often required to complete temporary or permanent merge events. As such, in addition to particular dNFTs/sdNFTs identified for the merge, merge requirements may include payments made with fungible tokens associated and/or compliant with the particular platform associated with the dNFTs/sdNFTs of interest. Process 300 indicates how fees payments associated with temporary or permanent merge processes of the instant invention are resolved.

At step 310, the wallet owner initiates the payment process 300 through a user device that communicates with the system backend 302 and smart contract 303 associated with the dNFTs/sdNFTs of interest. In one embodiment, this communication is made through a function call by, from, or in the user's wallet (e.g., "BuyWithBUSD," "BuyWithBNB"). These function called may be specific to the digital currency being used for the payment (e.g., "Binance USD" ("BUSD"), "Binance Coin" ("BNB")). At step 311, the data details associated with the payment (including relevant smart contracts) are transmitted to the DNFT_JOB 104 endpoint where (at step 312) the payment is processed. For example, in one embodiment, step 312 of process 300 sets a status indicator of the draft target dNFT/sdNFT created in steps 110-112 (described above for FIG. 1) to a standby mode (e.g., "wait-to-claim"). At step 313, metadata associated with the payment process and target dNFT/sdNFT is generated and linked to the target dNFT/sdNFT. Step 314 occurs at the "GENERATE META JOB" endpoint, which is essentially a publishing step for payment transaction. At step 314, the metadata generated in step 313 is uploaded to the backend databases. In one embodiment, the metadata is randomly generated. In another embodiment, the metadata is selectively generated. In yet another embodiment, the metadata can be both selectively and randomly generated.

Figure 6:
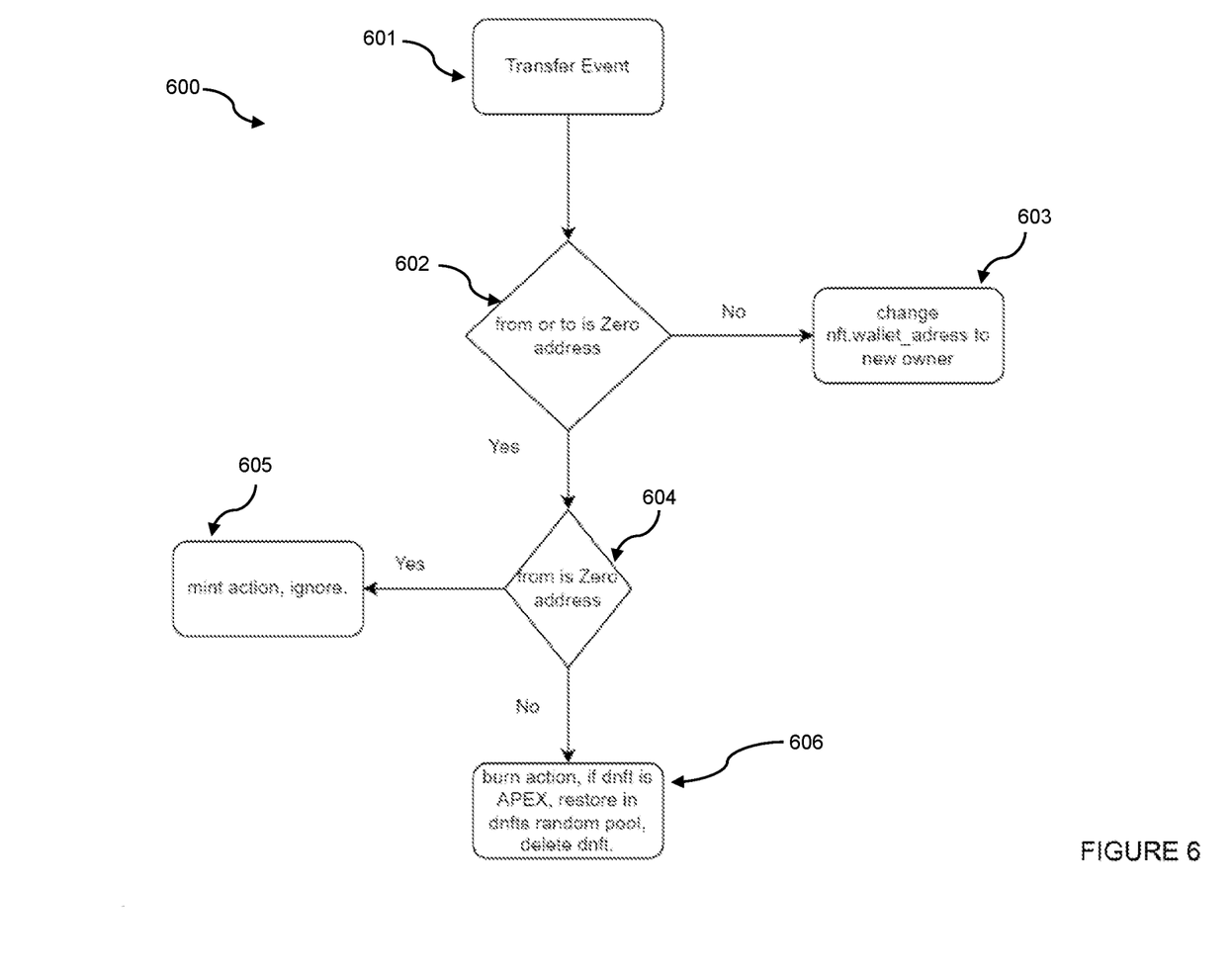
FIG. 6 is an event trace of the transfer validation event process, which is applicable to any dNFT or sdNFT tier, according to an aspect of the present disclosure.

FIG. 6 is an event trace of an optional "transfer validation event" process, which is applicable to any dNFT or sdNFT tier, according to embodiments of the present invention. In one embodiment, process 600 verifies that dNFTs/sdNFTs identified for the merging that have been transferred from a previous wallet owner to a new wallet owner have been properly transferred. Step 601 represents the step during which the particular dNFT/sdNFT was transferred to the new owner wallet. Step 602 checks the transaction record associated with the particular dNFT/sdNFT to verify if either the source or destination address is blank or zero. If neither address is blank or zero, the wallet address associated with the dNFT/sdNFT is changed (at step 603) to the wallet address of the new owner. If at least one of the source or destination address is blank or zero, process 600 continues to step 604. Step 604 checks which of the source and destination addresses is blank or zero. If either the source address or the destination address is blank or zero, the process 600 signals that the merge process should be ignored (at step 605 or step 606) because original or destination address of the dNFT/sdNFT cannot be determined, which would lead to errors in the transactional record.

In another embodiment, process 600 reconciles old dNFTs/sdNFTs that have been merged into a new or upgraded dNFT/sdNFT generated as a result of a permanent merge process 200. Step 601 represents the proposed merge event. At step 602, the process checks the dNFTs/sdNFTs in the users wallet to verify if either the source or destination address is blank or zero. If neither address is blank or zero, the dNFT/sdNFT being checked is not one of the dNFTs/sdNFTs processed in the merge. In that scenario, the wallet address associated with the dNFT/sdNFT updated or maintained as the wallet address of the new/current owner. If at least one of the source or destination address is blank or zero, process 600 continues to step 604. Step 604 checks which of the source and destination addresses is blank or zero. If either the source address is blank or zero, the process 600 signals that the merge process should be ignored (at step 605) because the source address of the dNFT/sdNFT cannot be determined, which would lead to errors in the transactional record. Optionally, if only the destination address of the old dNFT/sdNFT is blank or zero, then at step 606 the remainder of the old dNFT/sdNFT is burned or deleted from the dNFT/sdNFT supply.

Figure 5:
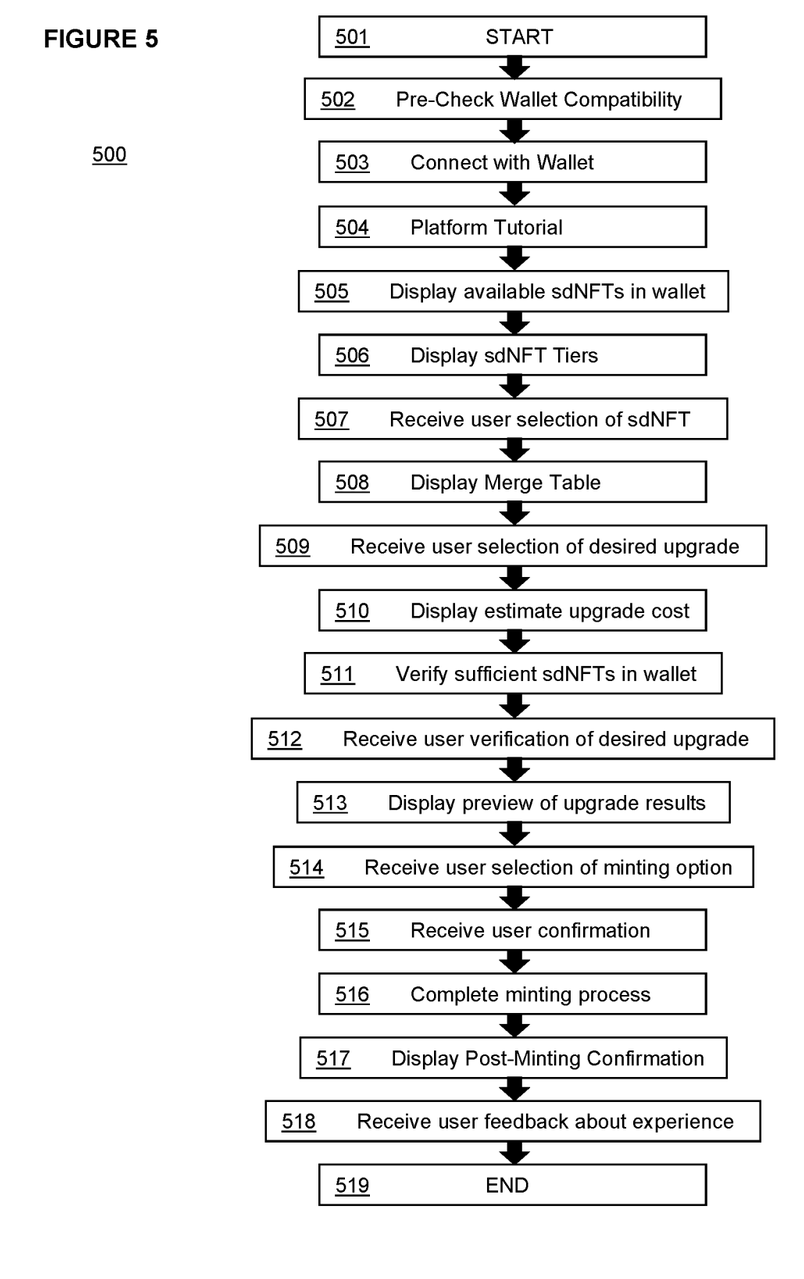
FIG. 5 is a flow diagram illustrating a method for generating digital assets according to an aspect of the present disclosure.

FIG. 5 is a flow diagram illustrating a method 500 for generating digital assets, including merged dNFTs and/or sdNFTs, according to one embodiment of the present invention. The method illustrated in FIG. 5 may be implemented in the form of a software algorithm or computer program product on a blockchain platform designed to support dNFTs and/or sdNFTs. The method is accessible through, e.g., a software application for mobile devices, a website, or a web portal. In one embodiment, a user interacts with the blockchain based algorithm or computer program product through a user interface. The user interface can correspond to a blockchain platform itself and/or a user interface for a video game on a blockchain platform. In one embodiment, the process disclosed in FIG. 5 begins at step 501 when the software user (e.g., the wallet owner) requests access to the dNFT/sdNFT platform through a user interface of a mobile application, video game, website, or web portal. The dNFT/sdNFT platform software typically resides on the system front end (such as the platform servers 401 illustrated in FIG. 4). However, elements of the dNFT/sdNFT platform software may also reside on other components of the system architecture (such as the content servers 403, databases 404, and distributed ledgers 405 illustrated in FIG. 4).

At step 502, upon receiving a wallet owner's request to access the dNFT/sdNFT platform, the dNFT/sdNFT platform software checks if the wallet owner has a wallet that is compatible with the dNFT/sdNFT platform. In performing step 502, the dNFT/sdNFT platform software checks one or more parameters of the wallet owner's wallet, including but not limited to the digital format of the wallet. For example, wallets must be formatted for use on/with a particular blockchain and may be formatted to be compatible with multiple blockchains. In a preferred embodiment, the dNFT/sdNFT platform software checks the wallet format to determine compatibility with the dNFT/sdNFT platform. If the dNFT/sdNFT platform determines that the wallet owner has at least one compatible wallet, the platform software proceeds to step 503. If the dNFT/sdNFT platform determines that the wallet owner has multiple compatible wallets, the platform requests that the wallet owner designate the particular compatible wallet that it would prefer to use for the merge process. Alternatively, the wallet owner designates one or more compatible wallets proactively without the dNFT/sdNFT platform software identifying compatible wallets that could potentially be used in the merge process. If the dNFT/sdNFT platform determines that a wallet owner does not have a compatible wallet, the platform sends a notification to the wallet owner that no compatible wallet has been detected. In one embodiment, the platform includes a prompt which initiates the generation of a compatible wallet for the wallet owner. Without a wallet compatible with the dNFT/sdNFT platform, the wallet owner is unable to access the dNFT/sdNFT platform.

At step 503, the dNFT/sdNFT platform connects to the wallet(s) that was recognized by the platform in step 502 and designated by the wallet owner or the platform as the wallet(s) to be used in the merge process. Once the wallet(s) are connected with the dNFT/sdNFT platform, the platform can access the digital assets contained in each wallet, including but not limited to fungible tokens, NFTs, dNFT, and/or sdNFTs. In a preferred embodiment, the dNFT/sdNFT platform accesses sdNFTs stored in the wallet, and those sdNFTs are usable in a video game that runs on the dNFT/sdNFT blockchain platform.

At step 504, the dNFT/sdNFT platform invites the wallet owner to participate in a tutorial of the dNFT/sdNFT platform. The tutorial is a guided walkthrough explaining how the wallet owner can interact with the features of the dNFT/sdNFT platform. The tutorial can include one or more of the following: pre-recorded media (e.g., audio and/or video) files demonstrating various features of the platform from the perspective of the wallet owner, document files containing written manuals and/or user guides explaining how a wallet owner can interact with the platform, and/or a live virtual session in which an individual or virtual assistant interacts with the wallet owner through a chat portal or virtual meeting to instruct the wallet owner how to use the platform. A wallet owner has the option to skip the tutorial after connecting a compatible wallet. The tutorial is available to new or returning users and is accessible to wallet owners any time when their designated compatible wallet is connected to the dNFT/sdNFT platform. Alternatively, in another embodiment of the process described in FIG. 5, step 504 is skipped and the software method proceeds directly to step 505 after completing step 503.

At step 505, after connecting with the designated compatible wallet of the wallet owner, the dNFT/sdNFT platform software causes a list of digital assets available in the connected wallet of the wallet owner to be displayed in the user interface. In one embodiment, the list includes at least two sdNFTs that can be merged. In another embodiment, a wallet owner can input a unique code corresponding to a particular dNFT/sdNFT asset residing in a different wallet (e.g., a secondary wallet, or the platform itself) that is also compatible with the dNFT/sdNFT platform. The secondary wallet can also be the wallet of a different wallet owner. If the main wallet owner and secondary wallet owner are different users, the main wallet owner receives the unique code for the dNFT/sdNFT only after the secondary wallet owner has granted permission to the main wallet owner to access that particular dNFT/sdNFT for the purpose of a temporary merge. For example, the secondary wallet owner that has arranged to loan their particular dNFT/sdNFT to a main wallet owner for the purpose of temporarily merging with a dNFT/sdNFT owned by the main wallet owner can authorize the dNFT/sdNFT platform to link the main wallet owner's wallet to the particular dNFT/sdNFT asset residing in the secondary wallet causing the unique code to be generated and sent to the main wallet owner. The unique code may include one or more of the following: an encrypted hash, an address, a passcode, and a security certificate. The dNFT/sdNFT platform software causes the user interface to display a prompt in which the main wallet owner may enter the unique code. After the dNFT/sdNFT platform software has received the unique code and verified that the secondary wallet owner has authorized the transfer, the dNFT/sdNFT platform software causes the user interface of the main wallet owner to include the particular dNFT/sdNFT corresponding to the unique code in the list of digital assets available to the main wallet owner. A unique code can also be generated and sent when the secondary wallet owner has authorized the permanent transfer of the particular dNFT/sdNFT to the main wallet owner.

In another embodiment for the loaning scenario discussed above, the loaned dNFT/sdNFT is alternatively transferred out of the original owner's wallet onto the dNFT/sdNFT platform and temporarily merged with the primary dNFT/sdNFT. The original owner of the loaned dNFT/sdNFT can claim it back from the platform after the agreed lending period, and it will transfer back to the original owner's wallet.

At step 506, the dNFT/sdNFT platform software causes a list of tiers to be displayed in the user interface. In a preferred embodiment the list of tiers can include, but is not limited to, one or more of the following tiers: Common, Rare, Rare Max, Legendary, Legendary Max, Apex, Apex Ultra. At step 506, the dNFT/sdNFT platform software also causes a list of the features, properties, characteristics, and collectibles associated with each tier to be displayed in the user interface. In a preferred embodiment of dNFTs/sdNFTs used in a video game, the list of features, properties, characteristics, and collectibles can include, but is not limited to, one or more of the following: strength, speed, agility, durability, intelligence, cosmic and natural abilities. In another embodiment of dNFTs/sdNFTs used in a video game, the list of features further can include, but is not limited to, a list of accessories and/or wearable features for a video game character. Exemplary accessories and/or wearable items can include, but is not limited to, leather jackets, knight suit, ninja/samurai suit, armor (various cultural heritage styles), helmets (e.g., military, samurai, other), weapons/accessories, neo summoning mask, fur, forcefield (with selectable colors), cosmic powers, nature powers, hair style (e.g., unique, mohawk), leather gloves, leather shoes, gloves metamaterials, military shoes, gameplay background.

At step 507, the dNFT/sdNFT platform software receives the wallet owner's selection of a primary dNFT/sdNFT for merging. The wallet owner's selection is made through the user interface. In one embodiment, the primary dNFT/sdNFT is selected from a specific tier.

At step 508, the dNFT/sdNFT platform software causes a merge table to be displayed in the user interface. The merge table details the merge requirements to upgrade a dNFT/sdNFT from one tier to another tier, including but not limited to the number of dNFTs/sdNFTs required for each upgrade. The merge table may also indicate transaction fees associated with the merge and existing dNFTs/sdNFTs that could be used to achieve the merge.

At step 509, the dNFT/sdNFT platform software receives the wallet owner's selection of the desired upgrade for the selected dNFT/sdNFT. For example, through the user interface, the wallet owner can select the upgrade tier for the selected dNFT/sdNFT. In one embodiment, the wallet owner may also select new features, properties, characteristics, accessories and/or wearable features, etc. that it wishes to incorporate into the upgraded dNFT/sdNFT.

At step 510, the dNFT/sdNFT platform software causes an estimated upgrade cost to be displayed in the user interface for the wallet owner. The estimated upgrade cost is the total cost associated with upgrading the selected dNFT/sdNFT to the tier desired by the wallet owner and/or with the features, properties, characteristics, accessories and/or wearable features, etc. desired by the wallet owner. In one embodiment, the estimated upgrade cost displayed in step 510 corresponds to the cost associated with the collective upgrade selected by the wallet owner in step 509. The estimated upgrade cost may include, but is not limited to, one or more of the following: the transaction fees associated with the upgrade, the identification of other dNFTs/sdNFTs in the wallet that may be selected to achieve the desired upgrade, and other associated costs. The transaction fees associated with the upgrade or merge transaction are dependent in part on the rates associated with the platform and/or the particular blockchain supporting the platform. For example, during peak usage periods when the available processing capacity of the blockchain and/or platform is minimal, the fees may be higher than periods of lower usage. Further, the merge exchange rate for the dNFTs/sdNFTs may be designated by the platform owner or manager.

At step 511, the dNFT/sdNFT platform software verifies that the designated wallet of the wallet owner contains sufficient resources (e.g, dNFTs/sdNFTs) to complete the requested upgrade. In one embodiment the verification process uses the estimated upgrade cost calculated in step 510 and determines whether the wallet owner's wallet contains the resources (e.g., fungible tokens and/or other dNFTs/sdNFTs) necessary to complete the upgrade. If the dNFT/sdNFT platform software confirms that the designated wallet contains sufficient resources, the dNFT/sdNFT platform software proceeds to step 512 at which the dNFT/sdNFT platform software receives through the user interface the wallet owner's selection of the particular resources it would like to use from the designated wallet to complete the upgrade. If the dNFT/sdNFT platform software determines that the designated wallet does not contain sufficient resources to complete the merge, the dNFT/sdNFT platform software notifies the wallet owner by prompting the wallet owner to acquire more resources (e.g., additional dNFTs/sdNFTs and/or fungible tokens).

At step 512, the dNFT/sdNFT platform software prompts the wallet owner to select through the user interface the particular resources that it would like to use from the designated wallet to complete the upgrade. For example, if the wallet owner selects (e.g., in step 509) to upgrade a selected sdNFT to a higher tier, and the dNFT/sdNFT platform software determines (e.g., in step 510) that such a merge would require two additional sdNFTs and a certain value of fungible tokens, the dNFT/sdNFT platform software then permits the wallet owner to select in the user interface the particular two sdNFTs and the particular amount of the fungible tokens that it would like to use to complete the merge. The dNFT/sdNFT platform software may also permit the wallet owner to specify the details of the merge at a granular level. For example, the wallet owner may select specific details and aspects of the dNFT/sdNFT identified for merging that should be carried through to the resulting merged dNFT/sdNFT. In one embodiment for a video game, these details and aspects can include, but are not limited to, one or more of the following: features, properties, characteristics, accessories and/or wearable features. Further, if other features, properties, characteristics, accessories and/or wearable features are available for selection based on the specific resources identified by the wallet owner to complete the merge, the wallet owner may select those features as well for incorporation into the resulting dNFT/sdNFT. After receiving the wallet owner's selections in step 512, the dNFT/sdNFT platform software proceeds to step 513.

At step 513, the dNFT/sdNFT platform software causes a summary of the preliminary details of the upgrade to be displayed in the user interface for the wallet owner and prompts the user to confirm the upgrade. In one embodiment, the summary includes details associated with the dNFT/sdNFT selected for upgrade, the resources (e.g., additional dNFTs/sdNFTs and/or fungible tokens) selected to achieve the upgrade, the features that will be carried through from the original dNFT/sdNFT selected for upgrade to the new upgraded dNFT/sdNFT, and the details of the expected outcome of the upgrade. The details of the expected outcome of the upgrade may include at least the details of the dNFT/sdNFT that will be the result of the upgrade. When causing the summary of the upgrade to be displayed in the user interface, the dNFT/sdNFT platform software also displays a prompt through which the wallet owner interacts to confirm or reject the upgrade details. If the wallet owner confirms the upgrade details, the dNFT/sdNFT platform software proceeds to step 514 of the process. If the wallet owner rejects the upgrade details, the dNFT/sdNFT platform software returns to step 512 of the process.

At step 514, the dNFT/sdNFT platform software causes the user interface to display a prompt through which the wallet owner can select an option for the dNFT/sdNFT platform to generate (i.e. "mint") the upgraded dNFT/sdNFT. For example, the wallet owner can opt for the upgraded dNFT/sdNFT to be generated using a temporary merge process. An embodiment of the temporary merge process is illustrated in FIG. 1. As described above for FIG. 1, in a temporary merge process, the upgraded dNFT/sdNFT can revert back to its original status after a designated period of time. In the context of FIG. 5, a selection of the temporary merge process means that the merge will not be automatically permanent (i.e. irreversible). For example, under the temporary merge process, the original dNFT/sdNFT and the dNFTs/sdNFTs identified to satisfy the upgrade can be designated to revert back to their original state as separate dNFTs/sdNFTs after a designated period of time. Additional logical conditions may also be applied to the temporary merge process. For example, the process can be configured such that the identified dNFTs/sdNFTs revert back to their original state as separate dNFTs/dNFTs only if the merge is canceled within a specific time. Alternatively, the process can be configured such that the identified dNFTs/sdNFTs revert back to their original state as separate dNFT/sdNFTs only if the resulting merge is accepted or confirmed with a specific time. The temporary merge process permits secondary wallet owners to temporarily loan dNFTs/sdNFTs in their wallets to other wallet owners (e.g., borrower wallet owners) seeking to temporarily merge the loaned dNFT/sdNFT with another dNFT/sdNFT in the wallet of the borrower wallet owner. As described above, the temporary merge process can be further configured to permit the statistics and properties of the loaned dNFT/sdNFT to be positively and/or negatively impacted by any usage of the dNFT/sdNFT during the loan period (e.g., the period when the loaned dNFT/sdNFT is temporarily merged with the dNFT/sdNFT identified for upgrade). Alternatively, at step 514, the wallet owner can opt for the upgraded dNFT/sdNFT to be generated using a permanent merge process. An embodiment of the permanent merge process is described above and illustrated in FIG. 2. As described above for FIG. 2, in a permanent merge process, the upgraded dNFT/sdNFT cannot revert back to its original status. In the context of FIG. 5, a selection of the permanent merge process means that the merge will be automatically permanent.

At step 515, the dNFT/sdNFT platform software causes the user interface to display a summary of the preliminary details of the upgrade (as confirmed at step 513), the wallet owner's selected merge process (as selected at step 514), and a confirmation prompt for the wallet owner to confirm the upgrade details. If the wallet owner confirms the details at step 515, the dNFT/sdNFT platform software proceeds to step 516 of the process. If the wallet owner rejects the upgrade details at step 515, the dNFT/sdNFT platform software returns to step 514 of the process. Step 515 is the final opportunity for the wallet owner to adjust the parameters of merge process before the merge process occurs.

At step 516, the dNFT/sdNFT platform software completes either a temporary or permanent merge process according the selections received from the wallet owner by the dNFT/sdNFT platform software. The details of the temporary and permanent merge processes are discussed above and illustrated in FIG. 1 and FIG. 2, respectively. In one embodiment, the the dNFT/sdNFT platform software causes the user interface to display a progress bar estimating the amount of time remaining to complete the merge/minting process while the process is being performed. Once the process has completed, the dNFT/sdNFT platform software proceeds to step 517.

At step 517, the dNFT/sdNFT platform software causes the user interface to display a confirmation about the completion of the minting process. The confirmation may indicate that the minting process has successfully completed and may also include the details about the transaction, including but not limited to the details of the newly generated dNFT/sdNFT. For example, if a temporary merge process was used, the confirmation may indicate the date on which further action is required to either prevent the merge from becoming permanent or prevent the original dNFT/sdNFT and the dNFTs/sdNFTs identified to satisfy the upgrade reverting back to their original state as separate dNFTs/sdNFTs. Alternatively, if the minting process was not successful, the confirmation may indicate that the process failed to generate the desired merged dNFT/sdNFT. For example, the confirmation may include, but is not limited to, one or more of the following: a notice that the target dNFT/sdNFT was not generated, an explanation for the failure such as an error code or error notice, and a prompt for the wallet owner to retry or cancel the minting process. Regardless of whether the mint process is successful or not, the confirmation may also include a prompt inviting the wallet owner to provide feedback about their experience using the dNFT/sdNFT platform to complete the merge process. The prompt may include one or more of the following mechanisms designed for the wallet owner to interact with the prompt and provide their feedback: a rating system, a comment field, and a survey.

At optional step 518, the dNFT/sdNFT platform software receives the wallet owners feedback provided in step 517. Since the feedback mechanism discussed in step 517 is optional, step 518 is only performed if a user has interacted with the feedback mechanism in step 517.

At step 519, the wallet owner is redirected to the home screen displayed in step 501.

With respect to the above description, the foregoing is considered illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope and spirit of the invention.

Embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for generating digital assets for a blockchain video game, the method comprising:
    receiving a user selection of a first dynamic non-fungible token, the first dynamic non-fungible token including first metadata representing a first set of video game character properties, features, and statistics, and a first identifier indicating an owner of the first dynamic non-fungible token;
    receiving a user selection of a second dynamic non-fungible token, the second dynamic non-fungible token including second metadata representing a second set of video game character properties, features, and statistics, and a second identifier indicating an owner of the second dynamic non-fungible token;
    receiving a user selection of preferred properties and features to be included in a third dynamic non-fungible token that includes third metadata representing a third set of video game character properties, features, and statistics;
    extracting the first metadata from the first dynamic non-fungible token;
    extracting the second metadata from the second dynamic non-fungible token;
    integrating a subset of the first metadata, a subset of the second metadata, and user selection of preferred properties and features into the third metadata representing the third set of video game character properties and statistics;
    generating the third dynamic non-fungible token that includes the third metadata and a third identifier indicating the owner of the third dynamic non-fungible token;
    recording the third dynamic non-fungible token on a blockchain.

2. The method of claim 1, wherein the first identifier, second identifier, and third identifier are the same.

3. The method of claim 1, wherein the second identifier is different from the first identifier and the third identifier.

4. The method of claim 1, further comprising destroying the first dynamic non-fungible token and the second dynamic non-fungible token after generating the third dynamic non-fungible token.

5. The method of claim 1, wherein the user selection of the first dynamic non-fungible token, the user selection of the second dynamic non-fungible token, and the user selection of preferred properties and features to be included in the third dynamic non-fungible token is performed through a user interface accessible via a user device.

6. The method of claim 5, wherein the second identifier is different from the first identifier and the third identifier.

7. The method of claim 1, wherein the third dynamic non-fungible token is generated by a permanent merge process.

8. The method of claim 1, wherein the third dynamic non-fungible token is generated by a temporary merge process.

9. The method of claim 1, wherein a draft of the third dynamic non-fungible token is generated and saved prior to the generation of the third dynamic non-fungible token.

10. A computer program product comprising one or more tangible, non-transitory computer-readable media storing computer-readable instructions that when executed by one or more processors of a computing system, cause the computing system to:
    receive a user selection of a first dynamic non-fungible token, the first dynamic non-fungible token including first metadata representing a first set of video game character properties, features, and statistics, and a first identifier indicating an owner of the first dynamic non-fungible token;
    receive a user selection of a second dynamic non-fungible token, the second dynamic non-fungible token including second metadata representing a second set of video game character properties, features, and statistics, and a second identifier indicating an owner of the second dynamic non-fungible token;
    receive a user selection of preferred properties and features to be included in a third dynamic non-fungible token that includes third metadata representing a third set of video game character properties, features, and statistics;
    extract the first metadata from the first dynamic non-fungible token;
    extract the second metadata from the second dynamic non-fungible token;
    integrate a subset of the first metadata, a subset of the second metadata, and user selection of preferred properties and features into the third metadata representing the third set of video game character properties and statistics;
    generate the third dynamic non-fungible token that includes the third metadata and a third identifier indicating the owner of the third dynamic non-fungible token;
    record the third dynamic non-fungible token on a blockchain.

11. The computer program product of claim 10, wherein the first identifier, second identifier, and third identifier are the same.

12. The computer program product of claim 10, wherein the second identifier is different from the first identifier and the third identifier.

13. The computer program product of claim 10, wherein the computing system if further caused to destroy the first dynamic non-fungible token and the second dynamic non-fungible token after the third dynamic non-fungible token is generated.

14. The computer program product of claim 10, wherein the user selection of the first dynamic non-fungible token, the user selection of the second dynamic non-fungible token, and the user selection of preferred properties and features to be included in the third dynamic non-fungible token is performed through a user interface accessible via a user device.

15. The computer program product of claim 14, wherein the second identifier is different from the first identifier and the third identifier.

16. The computer program product of claim 10, wherein the computing system is caused to generate the third dynamic non-fungible token using a permanent merge process.

17. The computer program product of claim 10, wherein the computing system is caused to generate the third dynamic non-fungible token using a temporary merge process.

18. The computer program product of claim 10, wherein the computing system is caused to generate and save a draft of the third dynamic non-fungible token prior to the generation of the third dynamic non-fungible token.

19. A method for generating digital assets, the method comprising:

receiving a user selection of a first dynamic non-fungible token, the first dynamic non-fungible token including first metadata representing a first set of properties, features, and statistics, and a first identifier indicating an owner of the first dynamic non-fungible token;

receiving a user selection of a second dynamic non-fungible token, the second dynamic non-fungible token including second metadata representing a second set of properties, features, and statistics, and a second identifier indicating an owner of the second dynamic non-fungible token;

receiving a user selection of preferred properties and features to be included in a third dynamic non-fungible token that includes third metadata representing a third set of properties, features, and statistics;

extracting the first metadata from the first dynamic non-fungible token;

extracting the second metadata from the second dynamic non-fungible token;

integrating a subset of the first metadata, a subset of the second metadata, and user selection of preferred properties and features into the third metadata representing the third set of properties and statistics;

generating the third dynamic non-fungible token that includes the third metadata and a third identifier indicating the owner of the third dynamic non-fungible token;

destroying the first dynamic non-fungible token and the second dynamic non-fungible token;

recording the third dynamic non-fungible token on a blockchain;

wherein the first identifier, second identifier, and third identifier are the same.

20. The method of claim 19, wherein a draft of the third dynamic non-fungible token is generated and saved prior to the generation of the third dynamic non-fungible token.

* * * * *